United States Patent [19]
May

[11] 3,984,327
[45] Oct. 5, 1976

[54] FILTERS
[76] Inventor: Michael Axton May, Five Trees Works, Bakers Lane, Galleywood, Essex, England
[22] Filed: Mar. 6, 1975
[21] Appl. No.: 556,131

Related U.S. Application Data
[63] Continuation of Ser. No. 304,669, Nov. 8, 1972, abandoned.

[30] Foreign Application Priority Data
Nov. 12, 1971 United Kingdom............... 52750/71

[52] U.S. Cl.............................. 210/284; 210/345; 210/436; 210/472
[51] Int. Cl.² ....................................... B01D 25/00
[58] Field of Search .......... 210/169, 252, 253, 261, 210/262, 284, 288, 279, 290, 345, 436, 472

[56] References Cited
UNITED STATES PATENTS
2,435,510  2/1948  Rabjohn.......................... 210/284 X
3,297,163  1/1967  Landon........................... 210/169 X
3,451,554  6/1969  Wade............................. 210/288 X
3,618,774  11/1971 Delphin.......................... 210/169

FOREIGN PATENTS OR APPLICATIONS
1,587,415  3/1970  France........................... 210/169

Primary Examiner—Theodore A. Granger
Attorney, Agent, or Firm—Irving M. Weiner; Pamela S. Burt

[57] ABSTRACT

A filter, especially for swimming pools, comprises a group of superposed filter beds operating in parallel within a single outer casing. By this means, the capacity of the filter for the floor area used is greatly increased, and also the strength requirement for the outer housing is not greatly increased. The beds may be in open topped containers resting upon each other.

4 Claims, 1 Drawing Figure

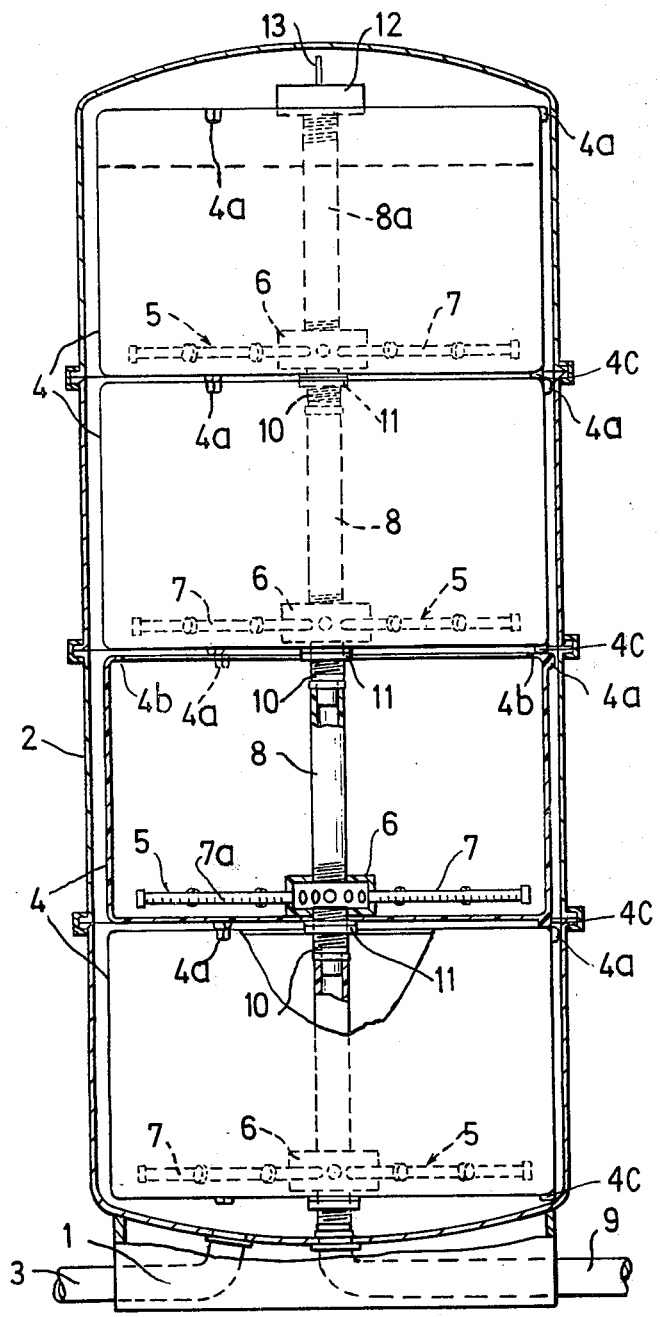

FILTERS

This is a continuation of application Ser. No. 304,669 filed Nov. 8, 1972 (now abandoned.)

This invention relates to filters, and more particularly, but not solely, to filters for swimming pools.

In a conventional swimming pool filter, the water from the pool is pumped through a bed of filter material, such as sand, whence it is collected by an underdrain, into which the water can pass but not the filter material, and returned to the pool. Very considerable pressures are involved in forcing the water through the bed and the flow of water onto the top of the bed has to be carefully controlled to ensure that the filter material is not significantly displaced or washed out. The rate of flow through the bed is thus necessarily restricted, which has led to a demand for larger bed areas to achieve the required overall flow but the construction and housing or larger area filters becomes expensive.

According to the present invention, there is provided a filter comprising a group of open-topped containers each adapted to contain a bed of filtering material, such as sand or other material heavier than water, and arranged one above another in a spaced, generally coaxial arrangement, each container having an underdrain near the bottom thereof to allow communication with an outlet for filtered liquid, the assembly of containers being mounted in an outer casing provided with an inlet for liquid to be passed in parallel through the open tops of the containers for filtration.

By arranging the containers in a superposed relationship, the requirement for floor area is considerably reduced when compared with a group of individual filters operating parallel or a single large diameter filter. Also, by making the outer casing cylindrical and of comparatively small diameter, it is more easily able to withstand the pressures involved than a large diameter cylinder.

Preferably the underdrains each feed into a common outlet pipe extending axially of the container and out of the outer housing.

The invention further consists in a swimming pool filter system including a filter according to the invention asset forth above.

The invention will be further described with reference to the accompanying drawing, which is a diagrammatic part sectional elevation of a preferred form of filter according to the invention.

The drawing shows a filter comprising a base member 1 having an outer, cylindrical drum-like casing 2 mounted thereon. The base member 1 is provided with an inlet 3 for water to be supplied to the interior of the casing 2. Within the casing 2 there are mounted a series of four superposed containers 4 which are arranged coaxially with the casing 2 and having their cylindrical walls spaced therefrom by lugs 4a. Each container is opened topped with an inturned flange 4b and closed at the bottom, and in operation as a filter, would be filled to a level, shown dotted in the uppermost container 4, within a short distance of the top of the side wall with sand, or other heavier than water filter material. The containers 4 each have a group of supporting lugs 4c or feet arranged around the periphery of the base to stand on the flange 4b of the container below or on the base of the casing 2. Each container 4 is provided near its base with an underdrain with is shown as including a central collecting element 6 and a series of radial arms 7 which are provided with narrow slits 7a to make them permeable to water but not substantially permeable to the filtration material to be used. The underdrains 5 are connected to a common outlet conduit formed by lengths of pipe 8 interconnecting the collecting elements 6, and passing to an outlet connection 9 on the base member 1.

Each collecting element 6 has threaded apertures in its upper and lower surfaces. The upper surface may thus receive a tapered thread on the lower end of a pipe length 8, while the lower surface receives a thread on a connector piece 10, passing through an aperture in the container 4, the piece 10 having an adjuster ring 11 to clamp the collecting element to the container 4. The lower end of the connector piece 10 forms a spigot to enter the upper end of the pipe length 8 leading to the next collecting element 6. The pipe length 8a leading up from the uppermost container 4 passes to an equilibrating chamber 12, which helps to equalise the flows to the different sand beds during backwashing, when water is passed from the underdrains to and through the sand beds to clean them. The flanges 4b help to prevent sand being washed out during this operation, and also it has been found useful to provide throttles or restrictions in the pipes 8 to assist the equalisation of flows during backwashing.

In operation, the water to be filtered flows in through the inlet 3 and up around the outsides of the containers 4 whence it flows into the open tops of the containers for passage through the filtration beds in them and the underdrains to the conduit 8 and the outlet 9. By having the containers located fairly close to the casing 2, the flow up around them is evenly distributed so that there is a minimum disturbance of the filtration beds by the water entering the top of the open containers. It will also be seen that the four containers effectively filter in parallel so that the effective filtering area is equivalent to the sum of the areas of the open tops of the containers, although the floor area occupied by the total filter is little more than that which would be occupied by a filter having the effective filtration area of one of the containers 4, when using a conventional design.

The casing 2 is shown sectionalised into rings which may be successively removed for access to the containers, which may then be removed with minimum lifting of the heavy filter bed. The sections are shown clamped together by bands clamping flanges of the adjacent sections.

In use, air entrained with the feed water tends to collect at the top of the casing 2, and in order to vent this as a sizable bubble forms, an air vent tube 13 leads into the chamber 12. The flow of water through the underdrains into the pipe lengths 8 creates an injection effect, so that when an air bubble 6 contacts the vent tube 13, the bubble is drawn into the pipe length 8a and thence to the outlet 9.

Various modifications may be made within the scope of the invention. For instance, either a greater or lesser number than four containers could be used depending on the filtration requirement. Also, the casing 2 could be in the piece end reinforced at intervals over its length by the addition of reinforcing bands, or it could be reinforced by appropriately located stiffening corrugations. Also, the underdrain arms could be replaced by arms of gauze of suitable coarseness.

I claim:

1. In a filter of the sand or like bed type, the improvement comprising:

an outer casing provided with a liquid inlet connection;

a group of open-top containers each having a base, a sidewall, an inturned flange at the top of said sidewall, and a series of lugs spaced on said base to engage on the flange of the next lower container or on the base of the outer casing to space the base therefrom;

said containers being arranged in superposed relationship within the outer casing in a spaced, generally co-axial arrangement, with their respective sidewalls close to, but spaced from, the outer casing to define a distribution channel for water;

each container has disposed therein a filter bed of sand or other suitable filtering medium;

an underdrain disposed in each of said containers close to said base thereof;

a common liquid outlet conduit substantially coaxial with said containers, communicating with each of said underdrains and connected to said liquid outlet connection;

each said container includes a series of spacing lugs to space it from said outer casing; and each said sidewall of each of said containers constitutes a continuous outer vertical wall which is completely solid and has no ports therein or therethrough so that water passing into said casing through said inlet connections passes to said distribution channel and is compelled to pass over said inturned flange of each of said containers and between said lugs into said filter beds and through said filter beds in said containers to said underdrain therein and to said outlet conduit and outlet connection.

2. A filter as claimed in claim 1 in which the underdrains in the open-topped containers each consist of a central collecting element and a series of water permeable radial arms.

3. A filter as claimed in claim 2, in which the central collecting elements communicate with lengths of pipe forming a common outlet conduit.

4. A filter as claimed in claim 3, in which the common outlet conduit communicates with an air vent situated in the upper part of the outer casing.

* * * * *